(12) United States Patent
Inoko

(10) Patent No.: US 6,417,941 B1
(45) Date of Patent: Jul. 9, 2002

(54) HOLOGRAM-TYPE POLARIZED-LIGHT SPLITTING ELEMENT

(75) Inventor: Kazuhiro Inoko, Funabashi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/623,672

(22) PCT Filed: Feb. 3, 1999

(86) PCT No.: PCT/JP99/00441

§ 371 (c)(1),
(2), (4) Date: Sep. 7, 2000

(87) PCT Pub. No.: WO99/49339

PCT Pub. Date: Sep. 30, 1999

(30) Foreign Application Priority Data

Mar. 24, 1998 (JP) .......................................... 10-075738

(51) Int. Cl.7 ................................................. G02B 5/32
(52) U.S. Cl. ........................... 359/15; 359/487; 359/488
(58) Field of Search ........................... 359/15, 487, 488

(56) References Cited

U.S. PATENT DOCUMENTS 5,387,991 A * 2/1995 Mitsutake et al. .......... 359/487
5,486,934 A * 1/1996 Huang ......................... 359/15

FOREIGN PATENT DOCUMENTS

| JP | A58134621 | 8/1983 |
|---|---|---|
| JP | A61240204 | 10/1986 |
| JP | A62249107 | 10/1987 |
| JP | A6326604 | 2/1988 |
| JP | A4360103 | 12/1992 |
| JP | A7248417 | 9/1995 |
| JP | A9203897 | 8/1997 |
| JP | A10206634 | 8/1998 |

OTHER PUBLICATIONS

Dickson et al., Applied Optics, vol. 33, No. 23, pp. 5378–5385 (1994).

* cited by examiner

*Primary Examiner*—Cassandra Spyrou
*Assistant Examiner*—Leo Boutsikaris

(57) ABSTRACT

A hologram polarized light separator which does not generate heat when absorbing an unnecessary polarized component, does not degrade, has a high degree of separation, is lightweight, and allows a system to be of a small scale. Incident natural light (I) incident normally on the surface of a hologram (1) is separated into a first linearly polarized light ($E_1$) traveling without being diffracted and a second linearly polarized light ($E_2$) polarized perpendicularly to the direction of polarization of the first linearly polarized light ($E_1$). The first linearly polarized light ($E_1$) passes through a substrate glass (2) as it is; the second linearly polarized light ($E_2$) undergoes internal total reflection at the glass-air boundary line and cannot go out to the output side of the separator. Therefore, the separator can allow only one of the polarized components of the incident natural light to travel in a predetermined direction. A liquid crystal projection display comprising the separator is also disclosed.

13 Claims, 4 Drawing Sheets

HOLOGRAM-TYPE POLARIZED-LIGHT SPLITTING ELEMENT

This application is the national phase under 35 U.S.C. § 371 of PCT International Application No. PCT/JP99/00441 which has an International filing date of Feb. 3, 1999, which designated the United States of America.

TECHNICAL FIELD TO WHICH THE INVENTION PERTAINS

The present invention relates to a polarizing element for taking only unidirectional plane-polarized light out of natural light being so called indefinitely polarized light.

BACKGROUND OF THE INVENTION

A conventional liquid crystal projector (LC projection display) is provided with a liquid crystal display panel that necessarily uses a polarizing plate for cutting off unnecessary components from light outgoing therefrom for forming an image. However, a conventional dichroic type polarizing plate absorbs unnecessary light that becomes heat energy for internally heating the plate, causing premature deterioration of the plate. Accordingly, recent LC projectors use, instead of the polarizing plate, a polarized-beam splitter having a thin-film coat deposited thereon or diffraction type polarizing elements disclosed in Japanese Laid-Open Patent Publication No. 61-240204 and No. 62-249107 and Japanese Patent No. 2594548 (Japanese Laid-Open Patent Publication No. 63-26604).

However, the above described conventional methods have the following drawbacks:

The thin-film deposited type polarized-beam splitter is constructed of two glass-made prisms bonded to each other, which is thick and, therefore, is not so small and light to be usable in liquid crystal projectors. Namely, the use of this type beam splitter as a polarizing plate of a light outputting portion of a liquid crystal projector necessarily elongates a back focal length of a projector lens and, thereby, causes the need for increasing a diameter of the projection lens, a projection distance and a weight of a whole optical system.

The application of the diffraction type polarizing element described in Japanese Laid-Open Patent Publication No. 61-240204 as an emergent-side polarizing plate cannot produce a well-contrasted clear image since the element cannot completely split polarized light, causing leakage of light. The diffraction type polarizing element described in Japanese Patent No. 2594548 (Japanese Laid-Open Patent Publication No. 63-26604) as compared with the element of Japanese Laid-Open Patent Publication No. 61-240204 has a higher degree of polarized-beam separation, a higher contrast and a smaller wavelength-dependent diffraction difference that is estimated at a value of dispersion of refracting media. This element, however, cannot have a large diffraction angle because of a small differential refractive index of its diffraction grating. The use of this element as a polarizing plate on the emergent side of a liquid crystal projector elongates a back focal length of a projection lens. The hologram-type polarized-light splitting element described in Japanese Laid-Open Patent Publication No. 62-249107 has an excellent polarized-light splitting ability and a large splitting angle but has an incident light falling thereto at a large angle to a line perpendicular to the hologram plane, requiring a large working space. Therefore, the use of this element as an emergent-side polarizing plate in a liquid crystal projector may also require elongation of a back focal distance of a projection lens.

In view of the foregoing, the present invention was made to provide a hologram polarized-light splitting element capable of effectively splitting polarized light with no absorption of unnecessary light, i.e., eliminating the possibility of being heated by absorbed light and of deterioration by heat, which element is so light and small to form a compact optical system. The present invention is also directed to a compact liquid crystal display device using the above-described element.

SUMMARY OF THE INVENTION

An object of the present invention is to provide a hologram-type polarized-light splitting element made of a glass substrate with a hologram formed thereon, which element can split incident light into two plane-polarized (linearly polarized) components having polarization directions perpendicular to each other by allowing one of the components to pass the hologram after diffraction and the other component to pass straight without diffraction, and which element can select and emit only the non-diffracted plane-polarized component of the light in the specified direction and, at the same time, can further reflect the diffracted plane-polarized component at least once at a boundary between the glass substrate and medium surrounding the element. This element can thus split incident light at high accuracy with no absorption of unnecessary light component that may become thermal energy as observed in the conventional dichroic absorption type light polarizing element, thereby it can maintain high reliability of performance for its long service life. The element is a thin plate that can form a very compact and light optical system in which it can be disposed at right angles to an optical axis of the system.

Another object of the present invention is to provide a hologram-type polarized-light splitting element made of a glass substrate with a hologram formed thereon, in which the hologram is given diffraction properties for obtaining diffracted plane-polarized light and non-diffracted plane-polarized light from a p-plane-polarized component and a s-plane-polarized component, respectively, of incident light at a high separation degree by diffracting the former component to travel in the direction making a separation angle of 60 degrees with the travelling direction of the latter.

Still another object of the present invention is to provide a hologram-type polarized-light splitting element made of a glass substrate with a hologram formed thereon, in which the hologram is given diffraction properties for obtaining diffracted plane-polarized light and non-diffracted plane-polarized light from a p-plane-polarized component and a s-plane-polarized component, respectively, of incident light at a high separation degree by diffracting the former component to travel in the direction making a separation angle of 48.2 degrees with the travelling direction of the latter.

A further object of the present invention is to provide a liquid crystal projection display having a compact optical system with a short back-focal distance of a projection lens, which comprises a liquid crystal panel and at least a first polarizing element and a second polarizing element on the incident side and the emergent side, respectively, of the liquid crystal panel, in which each polarizing element is a hologram-type polarized-light splitting element according to the present invention, which element can split incident light into two polarized components at high contrast with no fear of being heated by light absorption and has no need for elongating a back focal length of its projecting lens.

DETAILED DESCRIPTION OF THE PREFERRED EMBODIMENT

A hologram-type polarized-light splitting element according to the present invention is a glass substrate with a transmitting-type hologram formed thereon for diffracting one of plane-polarized components of natural incident light vertically entering the element and allowing the other plane-polarized component perpendicular to the former component to pass therethrough without diffraction. The hologram has a specified grating angle, width, thickness and refractive index range so as to diffract polarized light at a specified angle necessary for obtaining high diffraction efficiency and totally reflecting light from a glass-to-air boundary of the glass substrate.

The preferred embodiments of the present invention will be described below with reference to the accompanying drawings.

Figure 1:
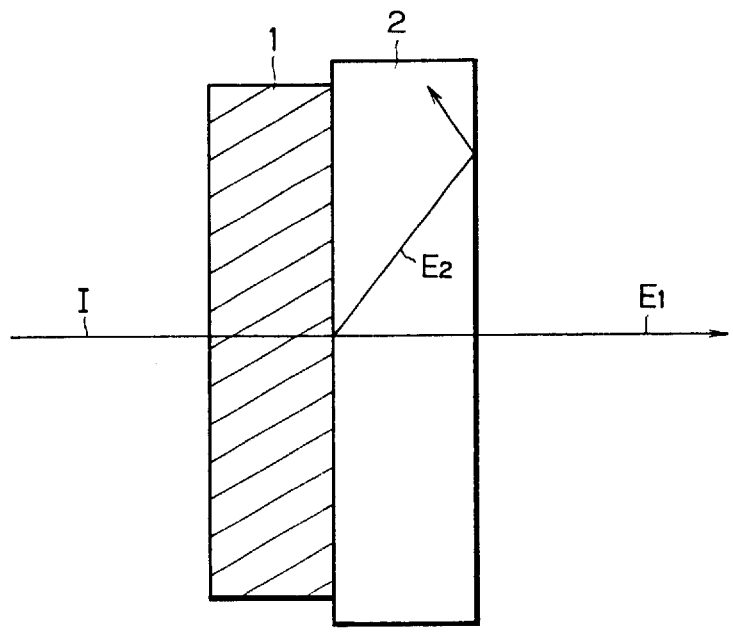
FIG. 1 is a view for explaining how incident light is split into diffracted light and transmitted light by means of a hologram-type polarized-light splitting element.

FIG. 1 is a view for explaining light rays diffracted and transmitted by a hologram-type polarized-light splitting element according to the present invention, which element comprises a hologram 1 and a grass substrate 2. In FIG. 1, there is shown natural incident light I, first plane-polarized light (transmitted light) $E_1$ and second plane-polarized light (diffracted light) $E_2$.

Figure 2:
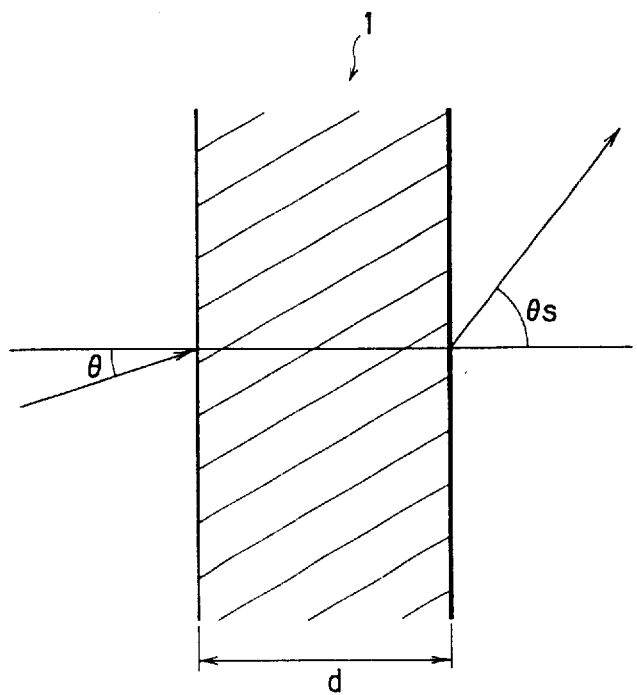
FIG. 2 is a view for explaining the principle of setting diffracting properties for a hologram-type polarized-light splitting element according to the present invention.

FIG. 2 is a view for explaining a diffraction angle selecting method applied to the hologram-type polarized-light splitting element according to the present invention, where d is a hologram thickness, θ is an angle of incident light and θs is an angle of emergent light with respect to an imaginary line perpendicular to the hologram surface.

A hologram-type polarized-light splitting element according to the present invention is constructed of a glass substrate 2 with a hologram 1 formed thereon. The hologram 1 is a volume-type phase hologram whose material and thickness are selected so that it achieves possibly highest diffraction efficiency. The hologram 1 has such a preset diffraction angle that it may most accurately split natural light into two plane-polarized components whose polarization directions are perpendicular to each other. One component is first plane-polarized light $E_1$ passing the hologram 1 without being diffracted and the other is second plane-polarized light $E_2$ diffracted by the hologram 1.

Referring to FIG. 2, the concept of setting diffraction properties of the hologram will be described below:

According to the Kogelnik's coupled-wave theory, diffraction efficiency η of the volume-type phase hologram can have the following expression (1) on the condition there is no absorption by material and Bragg's condition is satisfied.

$$\eta = \sin^2(v) \qquad (1)$$

$$v = \frac{\kappa d}{\sqrt{\cos\theta \cos\theta_s}} \qquad (2)$$

An angle θ made by light not diffracted inside the hologram with the line perpendicular to the surface of the hologram is equal to an angle θ of incident light. In the equation (2), k is called a coupling coefficient. Polarized light p and polarized light s may have different coupling coefficients $k_p$ and $k_s$ respectively.

$$\kappa_p = \pi n_1/\lambda \cos(\theta - \theta_s) \qquad (3)$$

$$\kappa_s = \pi n_1/\lambda \qquad (4)$$

Consequently, p-plane-polarized light and s-plane-polarized light have different values of diffraction efficiency.

A p-plane-polarized light diffracting hologram-type polarized-light splitting element may have diffraction efficiency ηp =1 for p-plane-polarized light, and diffraction efficiency ηs=0 for s-plane-polarized light. Therefore, ν=π/2 and ν=π are obtained according to Equation (1). From Equations (2), (3) and (4), the following condition can be derived.

$$|\theta - \theta_s| = 60° \qquad (5)$$

θ is equal to 0 when incident light enters the hologram perpendicularly to the top surface of the hologram. When θs is equal to 60°, the diffraction efficiency can be set to 1 for s-plane-polarized light and the diffraction efficiency can be set to 0 for p-plane-polarized light. In this instance, the first plane-polarized light $E_1$ becomes s-plane-polarized light and the second plane-polarized light $E_2$ becomes p-plane-polarized light as shown in FIG. 1.

As an example of a s-plane-polarized light diffracting hologram-type polarized-light splitting element, values for s-plane polarized light and p-plane-polarized light may satisfy the condition=and=3/2 respectively. Similarly to Equation (5), the following condition is obtained:

$$|\theta - \theta_s| = 48.2° \qquad (6)$$

Accordingly, the diffraction efficiency values 1 and 0 are obtained for s-plane-polarized light and p-plane-polarized light respectively when θ is 0 and θs=48.2°. In this case, the first plane-polarized light $E_1$ becomes p-plane-polarized light and the second plane-polarized light $E_2$ becomes s-plane-polarized light as shown in FIG. 1.

The natural light I entering the hologram 2 at the right angles thereto is split into the first plane-polarized light $E_1$ passing the hologram without being diffracted and the second plane-polarized light $E_2$ is diffracted at the specified angle by the hologram 2. The polarization direction of the second plane-polarized light $E_2$ is normal to that of the first plane-polarized light. The first non-diffracted plane-polarized light $E_1$ passes through the glass substrate 2. On the other hand, the second diffracted plane-polarized light $E_2$ travels in the glass substrate 2 and is completely reflected into the glass from a glass-to-air boundary, if the glass substrate 2 has a refractive index (ng) of 1.52, with a refraction angle exceeding the critical angle of 41° at the boundary. Therefore, the plane-polarized splitting element can selectively output only one of two plane-polarized components of incident natural light in a specified direction.

Figure 3:
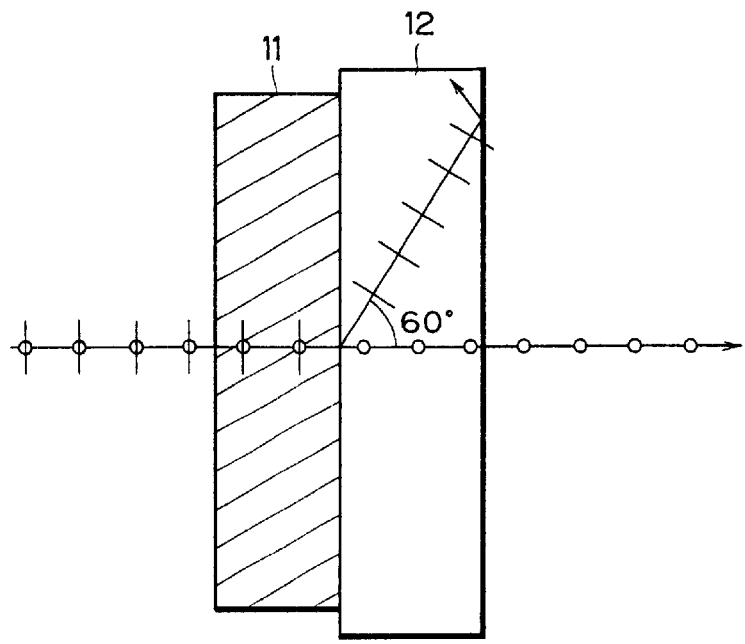
FIG. 3 is a schematic construction view of a hologram-type polarize light splitting element embodying the present invention.

FIG. 3 is a schematic construction view of a hologram-type polarized-light splitting element embodying the present invention. In FIG. 3, numeral 11 designates a hologram and numeral 12 designates a glass substrate.

Figure 4:
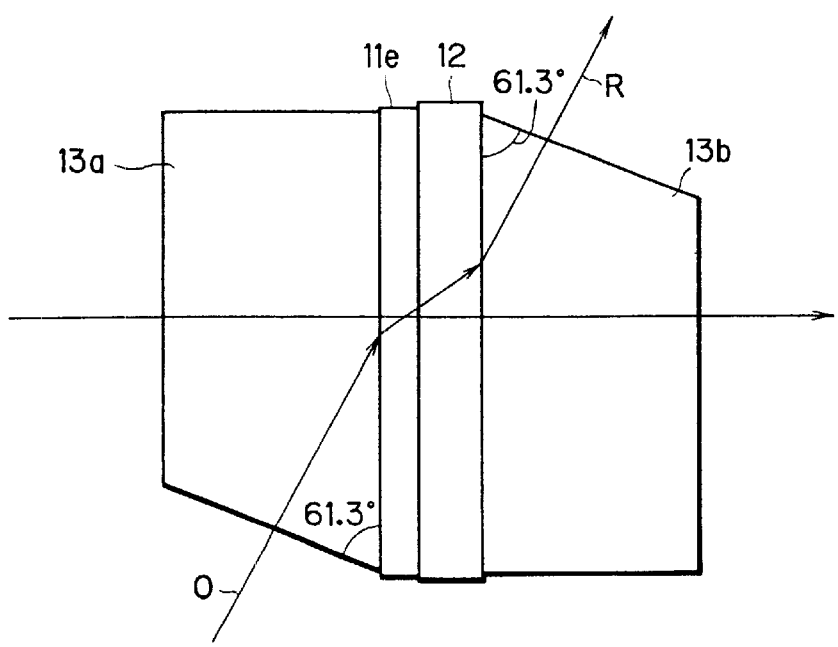
FIG. 4 is a view for explaining how to prepare a hologram-type polarized-light splitting element shown in FIG. 3.

FIG. 4 is a view for explaining how to prepare the hologram-type polarized-light splitting element shown in FIG. 3. There is shown a photosensitive material 11e, a first trapezoidal prism 13a, a second trapezoidal prism 13b, objective light O and reference light R. Other elements similar to those shown in FIG. 3 are given the same reference letters and symbols.

As described above with reference to Equation (5), the hologram can split incident plane-polarized light into two components by diffracting p-plane-polarized light at an angle of 60° to a non-diffracted s-plane-polarized light. A hologram made of photosensitive material, e.g., photo-polymer (n=1.54) having thickness (d) of 12.2 microns will be described below. The hologram is prepared by exposing the photosensitive material through an optical system shown in FIG. 4. The first and second trapezoidal prisms 13a and 13b have a trapezoidal section having an angle of 61.3° at one of four corners and are made of the same glass material (ng=1.52) that used for making the glass substrate 12. The trapezoidal prisms 13a and 13b are symmetrically attached with matching oil to opposite surfaces of a holographic dry plate that is a photosensitive material 11e made of photo-polymer and attached to the glass substrate 12. The dry plate is exposed to reference light R and objective light O coherent with the reference light R in such a way that light rays R and O enter the oblique surface of the prism 13a, making an angle of 63.1° with a line perpendicular to the glass substrate 12 as shown in FIG. 4. The objective light O is refracted at the boundary from the first trapezoidal prism 13a to the photosensitive material 11e, making an angle of 60° with the normal of the hologram, and interferes with the reference light R to form interference fringes inside the photosensitive material 11e. The trapezoidal prisms 13a and 13b are removed, then the exposed photosensitive material is processed to obtain a hologram-type polarized-light splitting element. In this instance, the prepared element is supposed to have the hologram with grating fringes recorded therein with a refractive index amplitude n1 of 0.03. The spacing between grating fringes formed in the hologram is 0.33 microns when the hologram was exposed to the light of 514 nm. The normal line of the grating fringes makes an angle of 60° with the normal line of the hologram.

When natural light having a wavelength of 514 nm enters the prepared hologram-type polarized-light splitting element along the normal line of the glass substrate 12, it can be split into two plane-polarized components s and p: the p-plane-polarized component is diffracted by the hologram 11 and totally reflected from the glass-to-air boundary, while the s-plane-polarized component travels straight (without being diffracted) and passes the glass substrate 12 as shown in FIG. 3. The wavelength range of the element can be expanded by overlaying a plurality of holograms or conducting multiple exposure of the photosensitive element.

Figure 5:
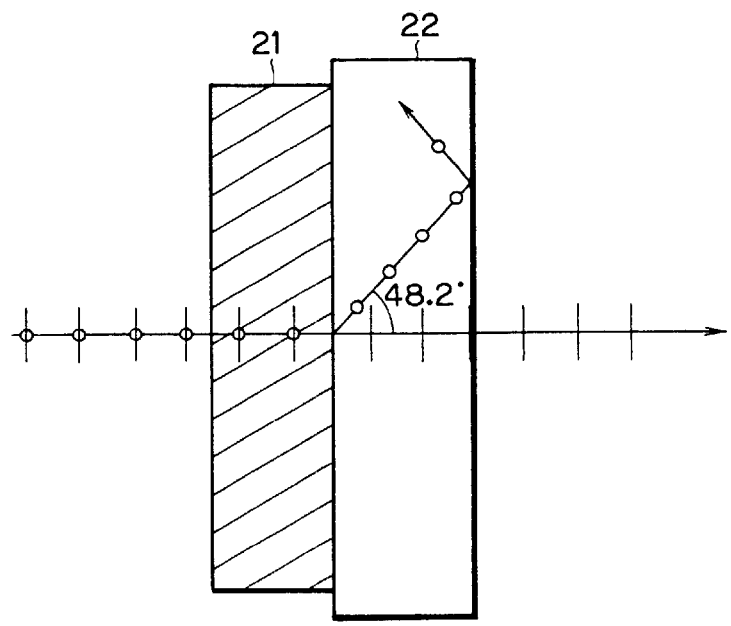
FIG. 5 is a schematic construction view of another hologram-type polarized-light splitting element embodying the present invention.
Figure 6:
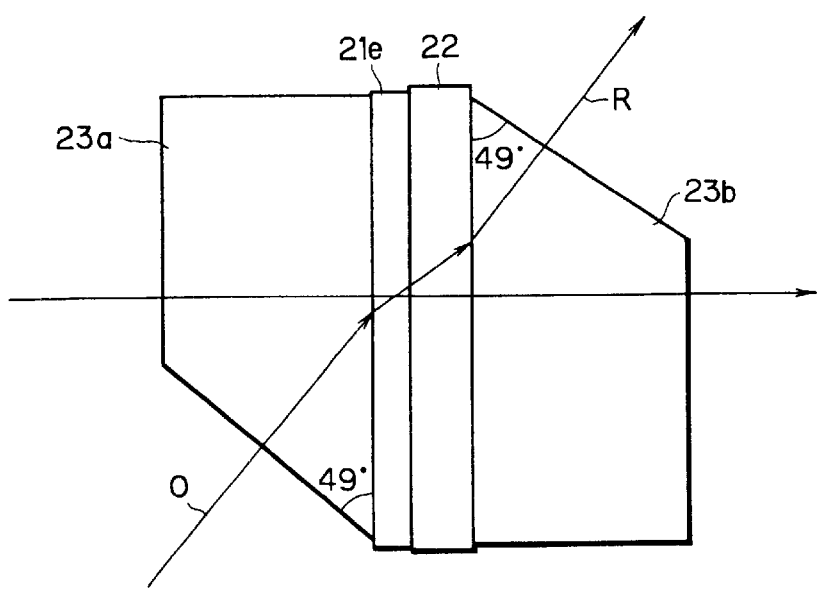
FIG. 6 is a view for explaining how to prepare a hologram-type polarized-light splitting element shown in FIG. 5.

FIG. 5 is a schematic construction view of another hologram-type polarized-light splitting element embodying the present invention. In FIG. 5, there is shown a hologram 21 and a glass substrate 22. FIG. 6 is a view for explaining how to prepare the hologram-type polarized-light splitting element of FIG. 5. In FIG. 6, there is shown a photosensitive material 21e, a first trapezoidal prism 23a, a second trapezoidal prism 23b, an objective light O and reference light R. Other elements similar to those of FIG. 5 are given the same reference characters.

As described before with reference to Equation (6), the hologram can split incident light into two plane-polarized light components s and p when it may diffract the s-plane component at an angle of 48.2° with respect to the non-diffracted p-plane component. A hologram made of photosensitive material, e.g., photo-polymer (n=1.54) having thickness (d) of 12.2 microns will be described below. The hologram is prepared by exposing the photosensitive material 21e through an optical system shown in FIG. 6. The first and second trapezoidal prisms 23a and 23b have a trapezoidal section having an angle of 49° at one of four corners and are made of the same glass material (ng=1.52) that used for making the glass substrate 22. The trapezoidal prisms 23a and 23b are symmetrically attached with matching oil to opposite surfaces of a holographic dry plate that is the photosensitive material 21e made of photo-polymer and attached to the glass substrate 22. The dry plate is exposed to reference light R and objective light O coherent with the reference light R so that light rays R and O enter the oblique surface of the prism 13a making an angle of 48.2° with a line perpendicular to the glass substrate 22 as shown in FIG. 6. The objective light O is refracted at the boundary from the first trapezoidal prism. 23a to the photosensitive material 21e, making an angle of 65.9° with the normal of the hologram, and interferes with the reference light R to form interference fringes inside the photosensitive material 21e. The trapezoidal prisms 23a and 23b are removed, then the photosensitive material is processed to obtain a hologram-type polarized-light splitting element. In this instance, the prepared element is supposed to have a hologram with grating fringes recorded therein with a refraction factor amplitude n1 of 0.03. The spacing between grating fringes formed in the hologram is 0.41 microns when the hologram was exposed to the light of 514 nm. The normal line of the grating fringes makes an angle of 65.9° with the normal line of the hologram.

When natural light having a wavelength of 514 nm enters the prepared hologram-type polarized-light splitting element along the normal line of the glass substrate 22, it can be split into two plane-polarized components s and p: the p-plane-polarized component is diffracted by the hologram 21 and completely reflected from the glass-to-air boundary, while the s-plane-polarized component travels straight (without being diffracted) and passes the glass substrate 22 as shown in FIG. 5. The wavelength range of the element can be expanded by overlaying a plurality of holograms or conducting multiple exposure of the photosensitive element.

Figure 7:
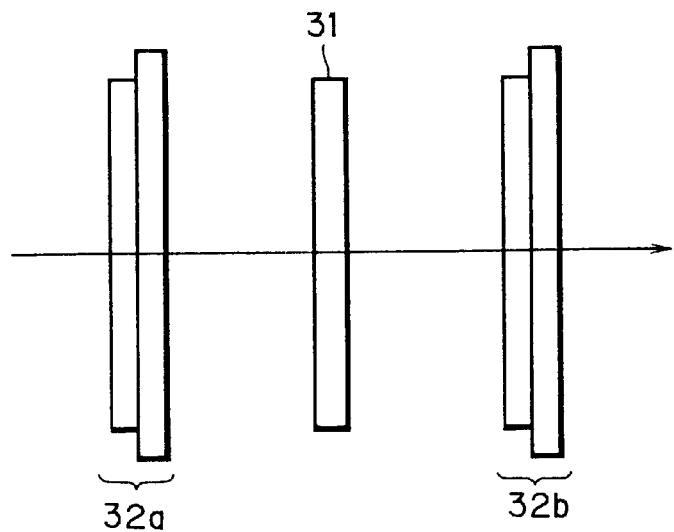
FIG. 7 is a schematic construction view of essential portions of a liquid crystal projection display according to an embodiment of the present invention.

FIG. 7 is a schematic construction view showing essential portions of a liquid crystal projection display according to an embodiment of the present invention. In FIG. 7, the liquid crystal display comprises a liquid crystal display panel 31, a first hologram-type polarized-light splitting element 32a and a second hologram-type polarized-light splitting element 32b. In this embodiment, the liquid crystal display panel 31 is provided with the first and second polarized-light splitting elements 32a and 32b disposed before and after liquid crystal display panel 31. Natural light from a light source (not shown) through an optical system (not shown) enters the first hologram polarized-light splitting element 32a by which it is split into two plane-polarized components whose polarization directions are perpendicular to each other. One component is diffracted by the hologram and then totally reflected from the glass substrate, not reaching the liquid crystal display panel 31. The other component passes through the first hologram-type polarized-light splitting element 32a and enters the liquid crystal display panel 31 in which the plane-polarized light is modulated. An unnecessary image-light component is further diffracted by the second hologram polarized-light splitting element 32b and then totally reflected. The liquid crystal projection display according to the present invention can be free from heat affection and aging because it uses the hologram-type polarized-light splitting element with no absorption of unnecessary light, instead of conventional dichroic type polarizing plate, as polarization elements before and after the liquid crystal display panel.

Figure 8:
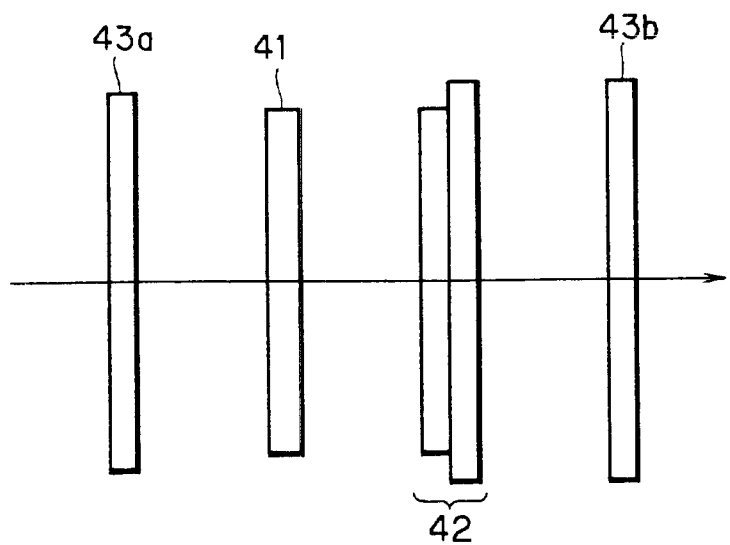
FIG. 8 is a schematic construction view of essential portions of a liquid crystal projection display according to another embodiment of the present invention.

FIG. 8 is a schematic construction view showing an essential portion of a liquid crystal projection display according to another embodiment of the present invention. In FIG. 8, the liquid crystal display comprises a liquid crystal display panel 41, a hologram-type polarized-light splitting element 42, an incident-side polarizing plate 43a and an emergent-side polarizing plate 43b. In this embodiment, the liquid crystal display panel 41 is provided with the incident-side polarizing plate 43a disposed in the front thereof and the emergent-side polarizing plate 43b disposed in the rear thereof. Furthermore, a hologram-type polarized-light splitting element 42 is disposed between the liquid crystal display panel 41 and the emergent-side polarizing plate 43b. Natural light emitted from a light source (not shown) through an optical system (not shown) enters the incident-side polarizing plate 43a in which one of the two plane-polarized light components having different polarization directions perpendicular to each other is absorbed and the other component is allowed to pass therethrough and enter the liquid crystal display panel 41 in which the plane-polarized light is then modulated. An unnecessary polarized-light component is diffracted by the hologram-type polarized-light splitting element 42 and then completely reflected from the boundary, not reaching the emergent-side polarizing plate 43b that can be thus protected from being heated by absorption of the unnecessary light and, therefore, from heat-aging.

THE INDUSTRIAL APPLICABILITY OF THE INVENTION

According to the present invention, it is possible to provide a hologram-type polarized-light splitting element that can accurately split polarized light into two plane-polarized components by means of a hologram having adapted diffraction properties and can operate without being heated due to absorption of light and can maintain high reliability of its performance for a long service life because it does not absorb unnecessary light components, in distinction from conventional dichroic absorption type polarizing elements. Furthermore, the element is a thin plate that can form a compact optical system because it can be disposed at right angles to the optical axis thereof.

According to the present invention, it is also possible to provide a hologram with preset conditions of diffraction properties necessary for splitting polarized-light at high degree of separation.

According to the present invention, it is further possible to provide a liquid crystal display having a compact optical system that can split incident polarized light into components without being heated because it does not absorb unnecessary light and does not require elongation of the back focal length of a projection lens.

What is claimed is:

1. A hologram-type polarized-light splitting element comprising a glass substrate with a hologram framed thereon a first surface, which element splits incident light into two plane-polarized components perpendicular to each other by allowing one of the components to pass the hologram after diffraction and the other component to pass therethrough without diffraction, and which element selectively outputs only the non-diffracted plane-polarized component of the light through a second surface opposite the first surface in a specified direction and, at the same time, totally reflects the diffracted plane-polarized component at least once at a boundary between the second surface of the glass substrate and medium surrounding the element.

2. A hologram-type polarized-light splitting element as defined in claim 1, wherein the hologram is given diffraction properties for obtaining diffracted plane-polarized light and non-diffracted plane-polarized light from a p-plane-polarized component and a s-plane-polarized component, respectively, of incident light at a high separation degree by diffracting the former component to travel in a direction making a splitting angle of 60 degrees with a direction of the latter.

3. A hologram-type polarized-light splitting element as defined in claim 1, wherein the hologram is given diffraction properties for obtaining diffracted plane-polarized light and non-diffracted plane-polarized light from a p-plane-polarized component and a s-plane-polarized component, respectively, of incident light at a high separation degree by diffracting the former component to travel in a direction making a separation angle of 48.2 degrees with a direction of the latter.

4. A liquid crystal projection di splay comprising a liquid crystal panel and at least a first-polarizing element and a second-polarizing element on the incident side and the emergent side, respectively, of the liquid crystal panel, wherein the first and/or second-polarizing element is the hologram-type polarized-light splitting element of claim 1 or 2 or 3.

5. A polarized light-splitting device, comprising:

a glass substrate;

a hologram formed on a first surface of the glass substrate,
wherein an incident light passing into the hologram and the glass substrate is split into two plane-polarized components, wherein only one of the two plane-polarized components passes through a second surface of the glass substrate, and the other one of the two plane-polarized components is prevented from passing through the glass substrate at the second surface and is internally reflected in the glass substrate at the second surface.

6. The device of claim 5, wherein the two plane-polarized components are polarized perpendicular to each other.

7. The device of claim 5, wherein said other one of the two plane-polarized components is diffracted into the glass substrate at the first surface.

8. The device of claim 7, wherein said other one of the two plane-polarized components is diffracted into the glass substrate at an angle of 60 degrees with respect to a normal to the first surface.

9. The device of claim 7, wherein said other one of the two plane-polarized components is diffracted into the glass substrate at an angle of 48.2 degrees with respect to a normal to the first surface.

10. A liquid crystal projection display, comprising:

a liquid crystal panel;

a first polarized light-splitting device on an incident side of the liquid crystal panel; and a second polarized light-splitting device on an emergent side of the liquid crystal panel, wherein at least one of the first and second polarized light-splitting devices is the polarized light-splitting device of claim 5.

11. A method of using one or more hologram-type polarized light-splitting devices in a liquid crystal projection display, wherein the hologram-type polarized light-splitting device includes a hologram formed on a glass substrate, the method comprising:

splitting an incident light into two plane-polarized components in a hologram-type polarized light-splitting device;

passing only one of the two plane-polarized components through a glass substrate of the hologram-type polarized light-splitting device and preventing output of the second plane-polarized component; and modulating said only one of the two plane-polarized components in a liquid crystal panel to form a modulated light beam.

12. The method of claim 11, further comprising:

passing the modulated light beam through a second hologram-type polarized light-splitting device; and removing an undesired polarization from the modulated light beam.

13. A hologram-type polarized-light splitting element comprising a glass substrate with a hologram formed thereon, which-element is capable of splitting incident light into two plane-polarized components perpendicular to each other by allowing one of the components to pass the hologram after diffraction and the other component to pass therethrough without diffraction, and which element selectively outputs only the non-diffracted plane-polarized component of the light in a specified direction and, at the same time, prevents output of the diffracted plane-polarized component by totally reflecting the diffracted plane-polarized component at a boundary between the glass substrate and medium surrounding the element.

* * * * *